United States Patent
Pandey

(10) Patent No.: US 8,238,674 B2
(45) Date of Patent: Aug. 7, 2012

(54) METHOD FOR ENCODING AND DECODING IMAGES

(75) Inventor: Rakesh Pandey, Delhi (IN)

(73) Assignee: Freescale Semiconductor, Inc, Austin, TX (US)

( * ) Notice: Subject to any disclaimer, the term of this patent is extended or adjusted under 35 U.S.C. 154(b) by 618 days.

(21) Appl. No.: 12/539,598

(22) Filed: Aug. 11, 2009

(65) Prior Publication Data

US 2011/0038551 A1 Feb. 17, 2011

(51) Int. Cl.
*G06K 9/36* (2006.01)
(52) U.S. Cl. ....................................... 382/232
(58) Field of Classification Search ........... 382/232–251
See application file for complete search history.

(56) References Cited

U.S. PATENT DOCUMENTS 6,804,402 B2 * 10/2004 Andrew ........................ 382/240
7,373,008 B2    5/2008 Clouthier et al.

FOREIGN PATENT DOCUMENTS

DE    EP1001612 B1    12/2006

OTHER PUBLICATIONS

Gonzalez & Woods, Digital Image Processing, Sep. 5, 2003, by Prentice Hall.
Jongware, An Analysis of a Gaming Imaging Algorithm, http://www.jongware.com/truelove.html, May 2005.
Robert Zigon, Run Length Encoding RLE is an Efficient—Yet Simple—Way of Reducing Storage Requirements, http://www.ddj.com/showArticle.jhtml;jsessionid=ADDGMWYOBT4Z0QSNDLRCKHSCJUNN2JVN?articleID=184408088&queryText=d%EF, Feb. 1, 1989.

* cited by examiner

*Primary Examiner* — Duy M Dang
(74) *Attorney, Agent, or Firm* — Charles Bergere

(57) ABSTRACT

A method for encoding an image includes identifying first and second sets of pixels from multiple pixels in a current row of the image, where the first set of pixels includes one or more pixels that are equal to one or more corresponding pixels in a reference row, and the second set of pixels are not equal to one or more corresponding pixels in the reference row. A third set of pixels that includes at least one of a first group of pixels selected from the first set of pixels and a second group of pixels selected from at least one of the first set and the second set of pixels is identified and encoded in an encoded data set.

18 Claims, 13 Drawing Sheets

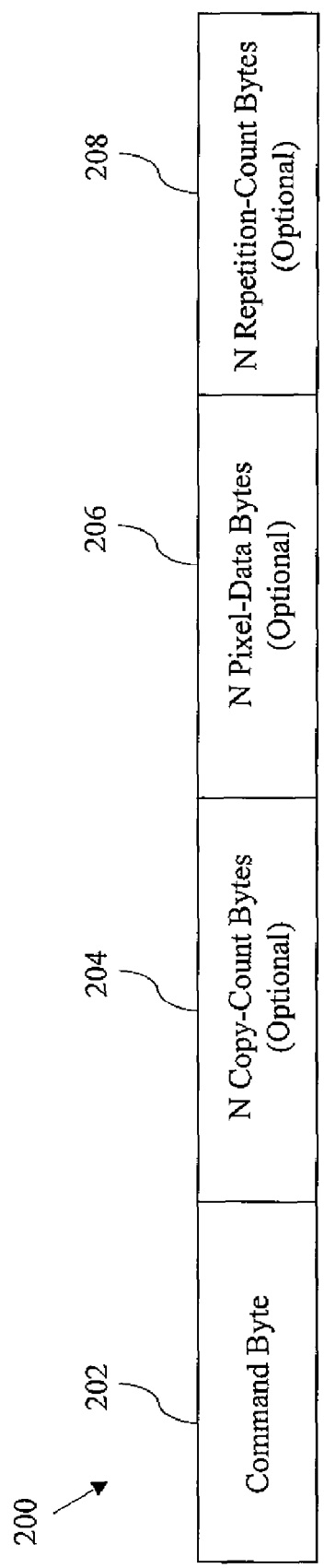

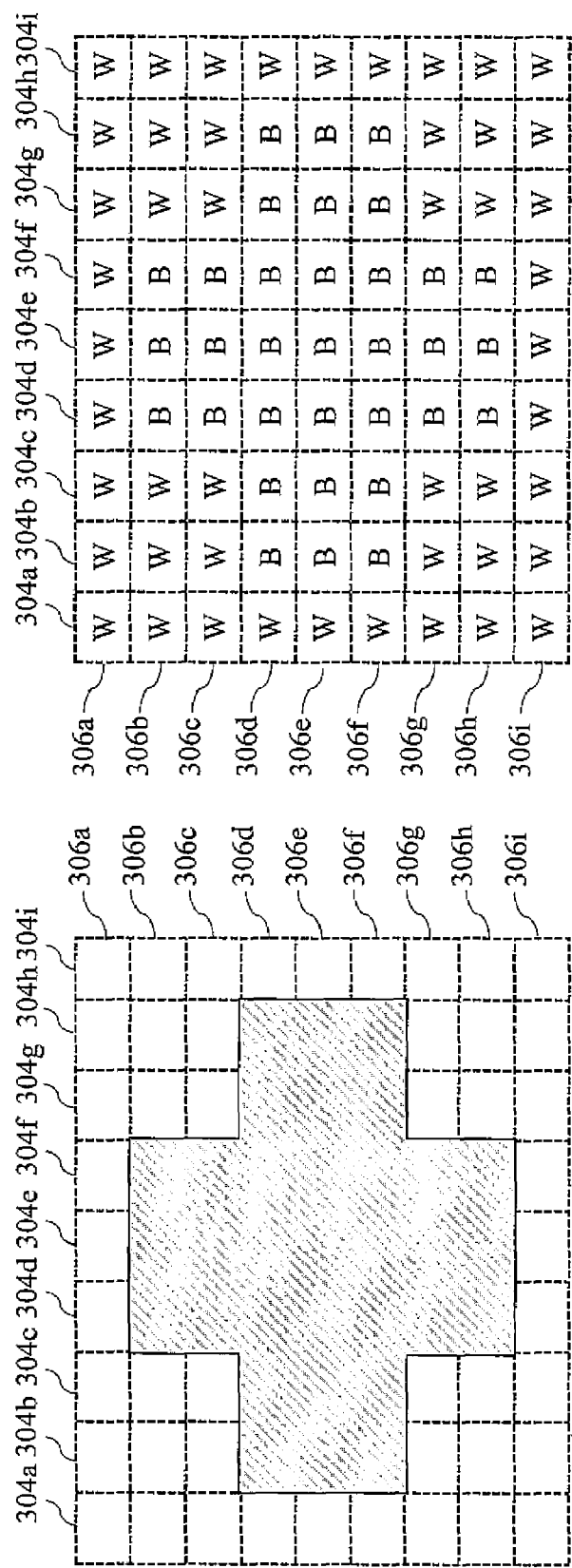

METHOD FOR ENCODING AND DECODING IMAGES

BACKGROUND OF THE PRESENT INVENTION

The present invention relates generally to data encoding and decoding techniques and, more specifically, to a method for encoding and decoding images to achieve lossless data compression.

Various display-based electronic devices require acquisition, storage, retrieval, and transmission of images. An image is stored in memory as a spatially mapped array of bits, referred to as a bitmap. Typically, images, in the form of bitmaps, require a large amount of memory space for storage and also high bandwidths for transfer, both internally, within an electronic device, and externally, between two or more electronic devices. For example, a 1024×1024 pixel gray scale image requires 1,048,576 bits of memory space and can take several minutes to be retrieved from the memory and transmitted to a display screen in the electronic device. Accordingly, it is desirable to reduce the amount of data required for representing the image to facilitate reduction in memory space required to store the image and reduction in bandwidth required for internal and external transfer of the image.

Due to resource limitations of embedded devices, the demand for techniques to enable data transmission at low bit-rates and reduce memory space requirements is high. A large variety of image compression techniques have been developed with the intent of eliminating redundancy in image data. Examples of image compression techniques include run length encoding (RLE), Huffman coding, Lempel-ziv-welch (LZW), and JPEG.

RLE is a lossless compression technique. In RLE, a "run" of pixels, i.e., a series of repetitive pixels of the same value within a row is encoded in a shorter code having two bytes. One byte, known as "run count", represents the length of the run and the other byte, known as "run value", represents the pixel value being repeated. For example, a character run of 10 "B" characters ("BBBBBBBBBB") is stored as "10B" in the memory, where 10 represents the "run count" and "B" represents the "run value". Hence, instead of storing each pixel value individually, only the "run count" and the "run value" are stored and thus, the memory space and bandwidth requirements are considerably reduced.

However, use of RLE for image compression also poses several challenges. RLE takes into account only horizontal redundancy of the image data, which results in comparatively lower compression ratios. Further, in the encoded image, it is difficult to distinguish between a byte containing the "run value" and the one containing the "run count". In accordance with one solution, at least one bit in each byte is devoted to indicating whether the byte contains the "run value" or the "run count". However, this methodology is useful only if the image is limited to 128 colors. In accordance with another solution, one bit is devoted to each byte to indicate the presence of the "run count" or the "run value". These extra bits are written as a compact array at the start of the encoded image. For example, the compact array corresponding to the encoded image 6, 4, 18, 9, 3, 4, 5, 7, 6 . . . , where 6, 18, and 7 correspond to the "run count", is written as 101000010 . . . at the start of the encoded image. However, the size of the compact array is one-eighth the size of the encoded image as it contains one bit for each byte of the encoded image and thus, increases the overall size and consequently decreases the compression ratios and the throughput capability of the technique.

It would be desirable to have an encoding technique that has higher compression ratios, can identify horizontal as well as vertical redundancy in the image data, does not alter the quality of the image, and can be implemented with minimal hardware and software requirements.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

FIG. 2A illustrates a data structure for storing an encoded data set corresponding to an image in accordance with an embodiment of the present invention;

FIG. 2B illustrates a command byte in the encoded data set stored in the data structure of FIG. 2A in accordance with an embodiment of the present invention;

FIGS. 3A-3D illustrate a method for encoding an 8-bit grayscale image in accordance with an exemplary embodiment of the present invention;

DETAILED DESCRIPTION OF THE PRESENT INVENTION

Figure 1:
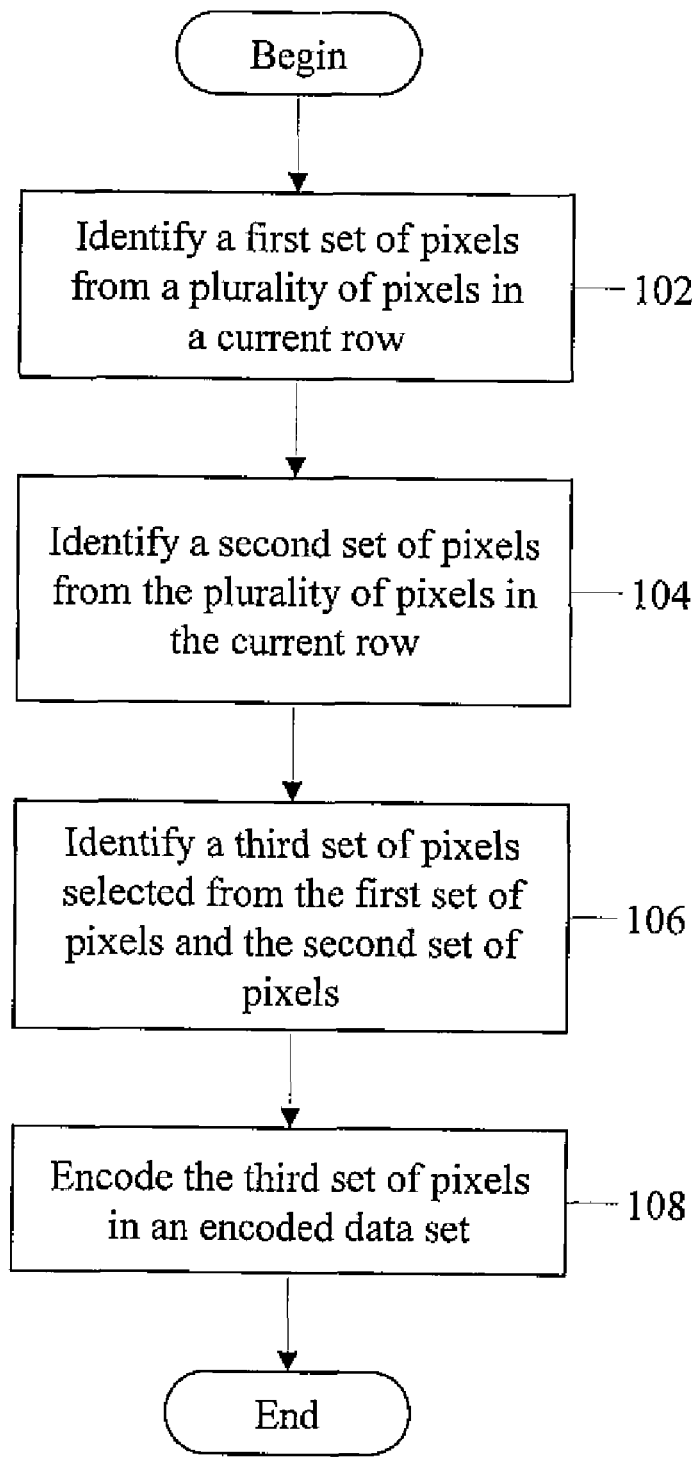
FIG. 1 is a flowchart of a method for encoding a current row of an image in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for encoding an image is provided. The image includes a plurality of pixels arranged in a plurality of rows and columns. The method includes identifying a first set of pixels from the plurality of pixels in a current row. The first set of pixels includes one or more pixels that are equal to one or more corresponding pixels in a reference row. Thereafter, a second set of pixels from the plurality of pixels in the current row are identified. The second set of pixels includes one or more pixels that are not equal to one or more corresponding pixels in the reference row. The method further includes identifying a third set of pixels that includes at least one of a first group of pixels selected from the first set of pixels and a second group of pixels selected from at least one of the first set and the second set of pixels. The first group of pixels includes one or more contiguous pixels. Similarly, the second group of pixels includes one or more contiguous pixels having a uniform pixel value. Further, in the second group of pixels, at least one pixel selected from the second set of pixels precedes one or more pixels selected form the first set of pixels in the current row. The first group of pixels and the second group of pixels are contiguous in the current row. The third set of pixels is encoded in an encoded data set. The encoded data set includes data corresponding to at least one of an end-of-row indicator indicating an end of the current row, a count of the first group of pixels, a count of the second group of pixels, and a pixel source for the one or more contiguous pixels in the second group of pixels.

In another embodiment of the present invention, a method for encoding an image is provided. The image includes a plurality of pixels arranged in a plurality of rows and columns. Further, each pixel is associated with an offset value. The method includes parsing a current pixel in a current row. The current pixel is a pixel corresponding to a current offset value. The current pixel is compared with a corresponding pixel in a reference row. If the current pixel is same as the corresponding pixel in the reference row then a value of a copy pixel is set equal to a value of the current pixel. Thereafter, a copy count is incremented. The copy count indicates a number of pixels to be copied from the reference row. Subsequently, the current offset value is incremented and the steps relating to parsing and comparison with a corresponding pixel in the reference row are repeated if the current pixel is not a last pixel in the current row. Otherwise, an end-of-row flag is set true and an encoding is performed.

However, if the current pixel is not same as the corresponding pixel in the reference row, then a value of a repetition pixel is set equal to the value of the current pixel. Thereafter, the current pixel is compared with the repetition pixel. If the current pixel is equal to the repetition pixel then a repetition count is incremented. The repetition count indicates the number of times the repetition pixel is repeated. Subsequently, the current offset value is incremented and the steps relating to parsing and comparison of the current pixel with the repetition pixel are repeated if the current pixel is not the last pixel in the current row. Otherwise, the end-of-row flag is set true and an encoding is performed. In encoding, one or more pixels are encoded in an encoded data set. The encoded data set includes information corresponding to at least one of the end-of-row flag, the copy count, the repetition count, and the repetition pixel. The above-mentioned method is performed for each pixel in each row of the plurality of rows.

In yet another embodiment of the present invention, a computer readable medium encoded with a data structure for storing an encoded data set corresponding to an image is provided. The image includes a plurality of pixels arranged in a plurality of rows and columns. The encoded data set includes information related to at least one of one or more copy pixels and one or more repetition pixels. The data structure includes a command byte. The command byte includes an end-of-row indicating bit for providing an indication of an end of a current row. The end-of-row indicating bit is set if the encoded data set includes information corresponding to a last pixel in the current row. The command byte further includes one or more copy-count bits for providing information related to at least a part of a copy count. The copy count indicates a count of the one or more copy pixels to be copied from a reference row. The command byte also has one or more repetition-count bits for providing information related to at least a part of a repetition count. The repetition count indicates a count of the one or more repetition pixels to be repeated in the current row. Further, the command byte has a pixel source bit for providing information related to a pixel source for a repetition pixel. The pixel source bit is reset if the repetition pixel is equal to a copy pixel and the pixel source bit is set if the repetition pixel is not equal to the copy pixel.

The data structure may further include one or more copy-count bytes if the one or more copy-count bits in the command byte are saturated. The one or more copy-count bytes provide information related to a part of the copy count. Further, at least one of the one or more copy-count bytes is unsaturated. The one or more copy-count bytes are contiguous with the command byte. The data structure may also include one or more pixel-data bytes if the repetition pixel is not equal to a last copy pixel. The one or more pixel-data bytes are contiguous with the one or more copy-count bytes. Further, the data structure may include one or more repetition-count bytes if the one or more repetition-count bits in the command byte are saturated. The one or more repetition-count bytes provide information related to a part of the repetition count. Further, at least one of the one or more repetition-count bytes is unsaturated. The one or more repetition-count bytes are contiguous with the one or more pixel-data bytes.

In yet another embodiment of the present invention, a method for decoding an encoded data set corresponding to an image is provided. The image includes a plurality of pixels arranged in a plurality of rows and columns. The encoded data set includes at least one of a command byte, one or more copy-count bytes, one or more repetition count bytes, and one or more pixel-data bytes. The command byte includes an end-of-row indicating bit, one or more copy count bits, one or more repetition count bits, and a pixel source bit. The method includes determining an end-of-row indicator, a copy count, a repetition count, and a repetition pixel source in the encoded data set. One or more copy pixels are reconstructed from one or more corresponding pixels in a reference row based on the copy count. Further, one or more repetition pixels are reconstructed from one of the one or more copy pixels and the one or more pixel-data bytes based on the repetition count and the repetition pixel source. The method further includes repeating one of an immediately preceding reconstructed repetition pixel till the end of a current row if the end-of-row indicating bit is equal to one and the repetition count is not equal to zero. However, the one or more copy pixels are reconstructed till the end of the current row from the one or more corresponding pixels in the reference row if the end-of-row indicating bit is equal to one and the repetition count is equal to zero.

Various embodiments of the present invention provide a method for encoding and decoding an image to achieve lossless data compression and de-compression. The method takes into account horizontal as well as vertical redundancy of pixels, thus, improving a compression ratio. An end-of-row indicating bit in the command byte further facilitates improving the compression ratio. Thus, the image containing texts, graphics, or a combination thereof, can be encoded with significantly improved compression ratios, thereby reducing the amount of data required to represent the image and consequently, reducing memory and bandwidth requirements leading to improved storage and data transfer capabilities. In addition, the method for encoding is implementable with minimal hardware and software requirements and hence, provides a cost effective solution for lossless data compression of an image.

Referring now to FIG. 1, a flowchart of a method for encoding a current row of an image in accordance with an embodiment of the present invention is shown.

At step 102, a plurality of pixels in a current row are parsed and a first set of pixels is identified from the plurality of pixels. The first set of pixels includes one or more pixels that are equal to one or more corresponding pixels in a reference row. In an embodiment of the present invention, the reference row is a predefined row and each pixel in the reference row is assigned a predefined value. In another embodiment of the present invention, the reference row is the row immediately preceding the current row.

At step 104, a second set of pixels is identified from the plurality of pixels. The second set of pixels includes one or more pixels that are not equal to one or more corresponding pixels in the reference row.

Next, at step 106, a third set of pixels is identified. The third set of pixels is selected from the first and second sets of pixels identified at steps 102 and 104, respectively. The third set of pixels includes at least one of a first group of pixels and a second group of pixels. The first group of pixels includes one or more contiguous pixels selected from the first set of pixels. The pixels in the first group of pixels are referred to as copy pixels. The second group of pixels includes one or more contiguous pixels having a uniform pixel value. The second group of pixels is selected from at least one of the first and second sets of pixels such that at least one pixel selected from the second set of pixels precedes one or more pixels selected from the first set of pixels in the current row. The one or more pixels are referred to as repetition pixels. Further, the first and second groups of pixels are contiguous in the current row.

At step 108, the third set of pixels is encoded in an encoded data set of the data structure 200 as described below with reference to FIGS. 2A-2B.

Referring to FIG. 2A, the data structure 200 for storing the encoded data set corresponding to the image in accordance with an embodiment of the present invention is shown. The data structure 200 includes a command byte 202, and optionally, one or more copy-count bytes 204, one or more pixel-data bytes 206, and one or more repetition count bytes 208.

Referring now to FIG. 2B, the command byte 202 in the encoded data set stored in the data structure 200 of FIG. 2A is shown, in accordance with an embodiment of the present invention. Each bit of the command byte 202 indicates predefined information corresponding to one or more pixels of the image encoded in the data structure 200. Examples of the information indicated by the bits of the command byte 202 include copy count information, repetition count information, pixel source information, and end-of-row indicative information.

The copy-count bytes 204 provide information related to a remaining part of the copy count information. The pixel-data bytes 206 provide the pixel value of a repetition pixel. The number of bytes in the pixel-data bytes 206 may vary based on the image quality and resolution. For example, for a colored image, the pixel-data bytes 206 may include three bytes of the repetition pixel, whereas for a grayscale image, the pixel-data bytes 206 may include only one byte of the repetition pixel. The repetition-count bytes 208 provide information related to a remaining part of the repetition count information. In various embodiments of the present invention, each row of the image is encoded separately in at least one data structure 200.

In one embodiment of the invention, the command byte 202 has 8 bits (i.e., bits 7-0), as shown in FIG. 2B. The most significant bit, bit 7, corresponds to an end-of-row indicating bit. The end-of-row indicating bit provides an indication regarding an end of the current row. In various embodiments of the present invention, the end-of-row indicating bit is set if the encoded data set of the data structure 200 includes information corresponding to a last pixel in the current row. Otherwise, the end-of-row indicating bit is reset.

The next three consecutive bits, bits 6-4, correspond to copy-count bits. The copy-count bits provide information related to at least a part of the copy count. The copy count indicates the number of copy pixels in the current row, i.e., the number of pixels to be copied from the reference row to the current row.

Bit 3 corresponds to a pixel source bit. The pixel source bit provides information related to a pixel source for the repetition pixels. In various embodiments of the present invention, the pixel source bit is reset if the pixel value of the repetition pixel is equal to a last copy pixel and is set if the pixel value of the repetition pixel is not equal to the last copy pixel.

The next three consecutive bits, bits 2-0, correspond to repetition-count bits. The repetition-count bits provide information related to at least a part of the repetition count. The repetition count indicates the number of times the repetition pixel is repeated. However, it should be understood that various other bit arrangements in the command byte 202 may be readily implemented, while retaining the primary aspects of the command byte 202.

As shown in FIG. 2A, the copy-count bytes 204 are contiguous with the command byte 202. In various embodiments of the present invention, if the copy-count bits in the command byte 202 are saturated, then the copy-count bytes 204 are included in the data structure 200 such that at least one copy-count byte is unsaturated. For example, if 260 pixels are to be copied from the reference row then the copy-count bits of the command byte 202 representing information related to a part of the copy count are set to 111 (7 pixels). However, as the copy-count bits in the command byte 202 are saturated, thus, an unsaturated copy-count byte is appended to the command byte 202 to represent the remaining part of the copy count i.e., 11111101 (253 pixels). The presence of the unsaturated copy-count bytes facilitates the determination of the completion of the copy count. However, if the repetition count=0 and the end-of-row indicating bit=1, the copy-count bytes 204 are not included in the data structure 200.

The pixel-data bytes 206 are contiguous with the copy-count bytes 204. In various embodiments of the present invention, if the pixel value of the repetition pixel is not equal to the last copy pixel, then the pixel-data bytes 206 are included in the data structure 200. Further, the number of bytes depicted by the pixel-data bytes 206 depends on the type of the image. For example, for an 8-bit image, the pixel-data bytes 206 include one byte of the pixel value of the repetition pixel. Similarly, for a 24-bit colored image, the pixel-data bytes 206 include three bytes of the pixel value of the repetition pixel.

The repetition-count bytes 208 are contiguous with the pixel-data bytes 206. In various embodiments of the present invention, if the repetition-count bits in the command byte 202 are saturated then, the repetition-count bytes 208 are included in the data structure 200 such that at least one repetition-count byte is unsaturated. For example, if 30 pixels having the uniform pixel value are to be repeated within the current row then the repetition-count bits of the command byte 202 representing information related to a part of the repetition count are set to 111 (7 pixels). However, as the repetition-count bits in the command byte 202 are saturated, thus, an unsaturated repetition-count byte is appended to the pixel-data bytes 206 to represent the remaining part of the copy count i.e., 00010111 (23 pixels). The presence of the unsaturated repetition-count bytes 208 facilitates the determination of the completion of the repetition count. However, if the copy-count bits are either 0 or unsaturated, the repetition-count bits are saturated and the end-of-row indicating bit=1, the repetition-count bytes 208 are not included in the data structure 200.

Referring now to FIGS. 3A-3D, schematic diagrams depicting a method for encoding an 8-bit grayscale image in accordance with an exemplary embodiment of the present invention are shown.

Referring to FIG. 3A, a schematic diagram depicting an image 302 is shown. The image 302 includes a plurality of pixels that are arranged in a plurality of columns 304a-304i (hereinafter referred to as columns 304) and a plurality of rows 306a-306i (hereinafter referred to as rows 306).

FIG. 3B is a pixel map of the image 302. The pixel map is a spatially mapped array of the plurality of pixels of the image 302. As shown in FIG. 3B, the image 302 is a grayscale image and each pixel corresponds to an 8-bit value for representing the grayscale.

Figure 3C:
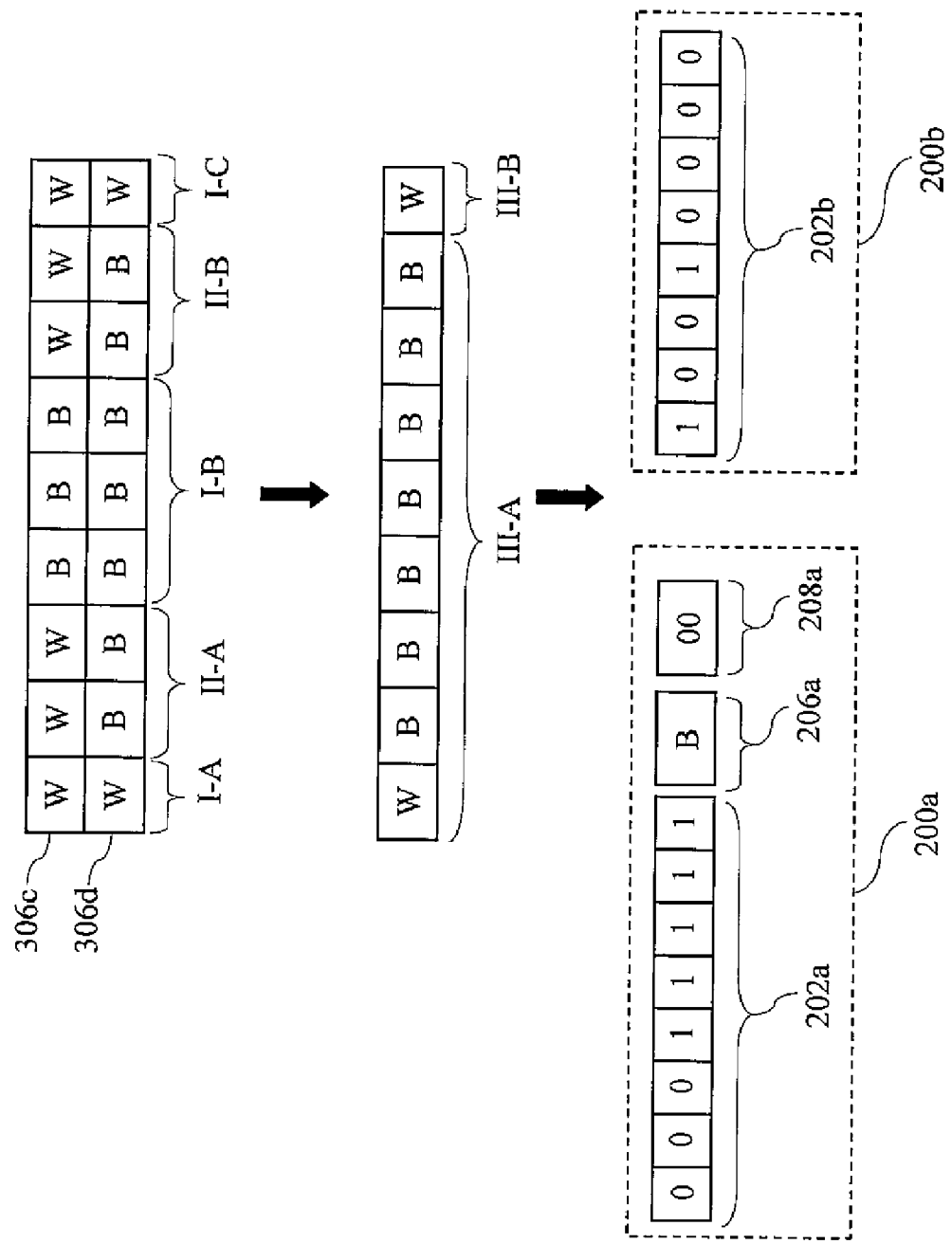

Referring to FIG. 3C, a method illustrating the encoding of the row 306d of the image 302 in accordance with an exemplary embodiment of the present invention is shown.

The plurality of pixels in the current row i.e., row 306d, are compared with the plurality of corresponding pixels of the reference row i.e., row 306c. As shown in FIG. 3C, the pixels of the row 306d that are equal to the corresponding pixels of the row 306c are categorized in the first set of pixels, such as I-A, I-B and I-C. The pixels of the row 306d that are not equal to the corresponding pixels of the row 306c are categorized in the second set of pixels, such as II-A and II-B.

Thereafter, a third set of pixels, such as III-A and III-B, is identified from the first and second sets of pixels. As shown in FIG. 3C, the third set of pixels III-A includes a first group of pixels (copy pixels) i.e., pixel 'W' selected from the first set of pixels I-A. The third set of pixels III-A further includes a second group of pixels (repetition pixels) i.e., 'BBBBBBB', having a uniform pixel value, that are selected from the first set of pixels I-B and the second set of pixels II-A and II-B. In various embodiments of the present invention, each of the first group of pixels and the second group of pixels includes one or more contiguous pixels. Also as shown in FIG. 3C, in the second group of pixels, the pixels 'BB' selected from the second set of pixels II-A precedes the pixels 'BBB' selected from the first set of pixels I-B and the first group is contiguous with the second group in the row 306d. Similarly, the third set of pixels III-B includes only the first group of pixels i.e., pixel 'W' selected from the first set of pixels I-C, where the pixel 'W' is a last pixel of the row 306d.

Thereafter, the third set of pixels III-A and III-B are encoded in the encoded data sets stored in the data structures 200a and 200b respectively. The data structure 200a includes the command byte 202a, the pixel-data byte 206a, and the repetition-count bytes 208a, and the data structure 200b includes the command byte 202b. Each of the command bytes 202a and 202b includes the predefined information related to the one or more pixels in the respective third set of pixels. For example, in the command byte 202a, the end-of-row indicating bit is reset indicating the absence of the last pixel in the third set of pixels III-A. Further, the copy-count bits are set to 001 (1 pixel), which indicates a count of the first group of pixels (copy pixels) and consequently, the number of pixels that are be copied from the row 306c. The pixel source bit is set to 1, which represents that the uniform pixel value of the second group of pixels (repetition pixels) is not equal to a pixel value of the last pixel in the first group of pixels. The repetition-count bits are set to 111 (7 pixels), which indicates a count of the second group of pixels (repetition pixels) and consequently, the number of times the pixel having the uniform pixel value is repeated in the row 306d. The 8-bit pixel value 'B' of the second group of pixels is represented by the pixel-data byte 206a. Due to the saturation of the repetition-count bits in the command byte 202a and the resetting of the end-of-row indicating bit, an unsaturated repetition-count byte 208a having value of '00' is included in the data structure 200a.

In an exemplary embodiment of the present invention, if the second group of pixels are repeated to the end of the row and the repetition-count bits in the command byte are saturated, then only the end-of-row indicating bit in the command byte 202 is set equal to one and the repetition-count bytes 208 are not included in the data structure 200.

Similarly, in the command byte 202b, the end-of-row indicating bit is set, which provides an indication of the presence of the last pixel in the third set of pixels III-B. Further, the copy-count bits are set to 001 (1 pixel), which indicates a count of the first group of pixels and consequently, the number of pixels that are be copied from the row 306c. Due to the absence of the second group of pixels in the third set of pixels III-B, the pixel source bit and the repetition-count bits are set to zero.

Figure 3D:
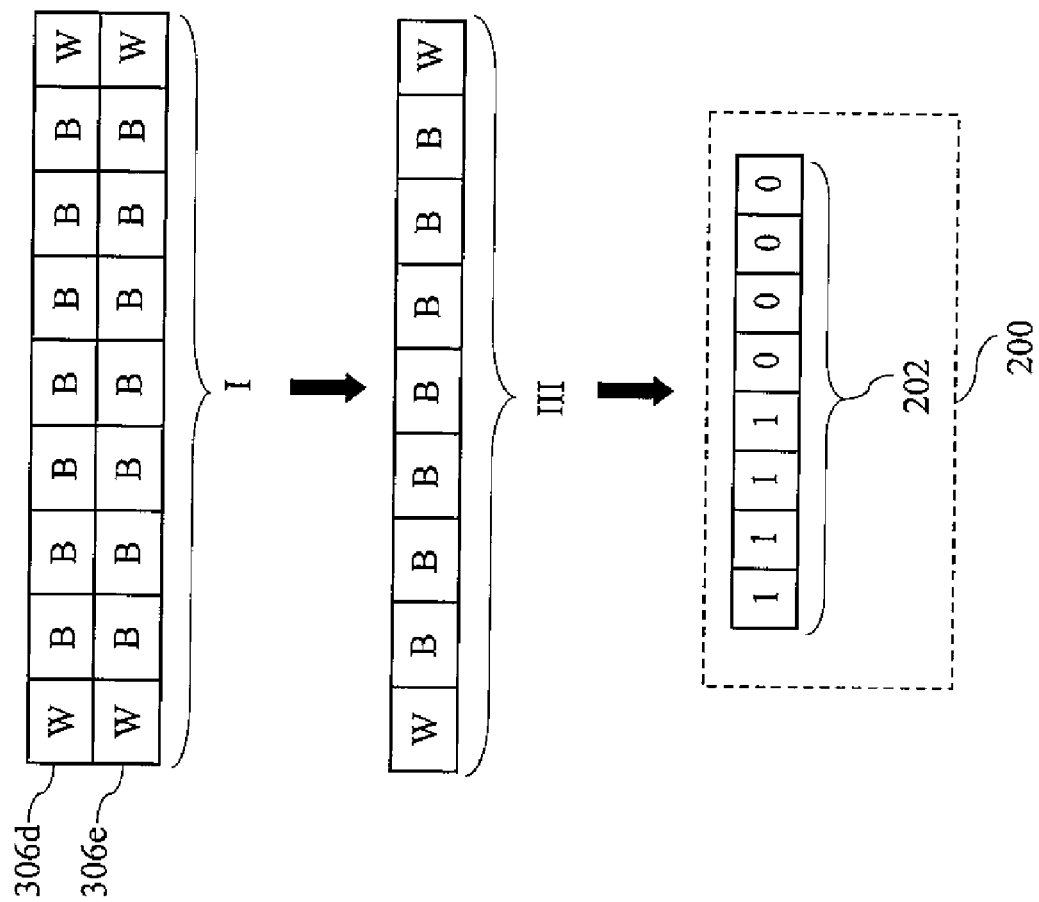

Referring now to FIG. 3D, a method illustrating the encoding of the row 306e of the image 302 in accordance with another exemplary embodiment of the present invention is shown.

As discussed above with reference to FIG. 3C, the plurality of pixels in the current row i.e., row 306e, are compared with the plurality of corresponding pixels of the reference row i.e., row 306d. However, all of the pixels in row 306e are equal to the corresponding pixels in row 306d. Thus, all of the pixels are categorized as the first set of pixels, i.e., I.

Thereafter, a third set of pixels III is identified from the first set of pixels I. The third set of pixels III includes a first group of pixels (copy pixels) i.e., pixels 'WBBBBBBW' selected from the first set of pixels I. The third set of pixels III is encoded in the encoded data set stored in the data structures 200. As shown in FIG. 3D, the data structure 200 includes the command byte 202. The command byte 202 includes the information related to the data in the third set of pixels III.

For example, in the command byte 202, the end-of-row indicating bit is set, which indicates the presence of the last pixel in the third set of pixels III. Further, the copy-count bits are set to 111 (7 pixel), indicating a part of the count of the first group of pixels (copy pixels) and consequently, the number of pixels that are to be copied from the row 306d. Further, due to the absence of the second group of pixels in the third set of pixels III, the pixel source bit and the repetition-count bits are set to zero. As the end-of-row indicating bit is set to one, hence, in spite of the saturation of the copy-count bits in the command byte, the copy-count bytes 204 are not appended to the command byte 202.

Figure 4A:
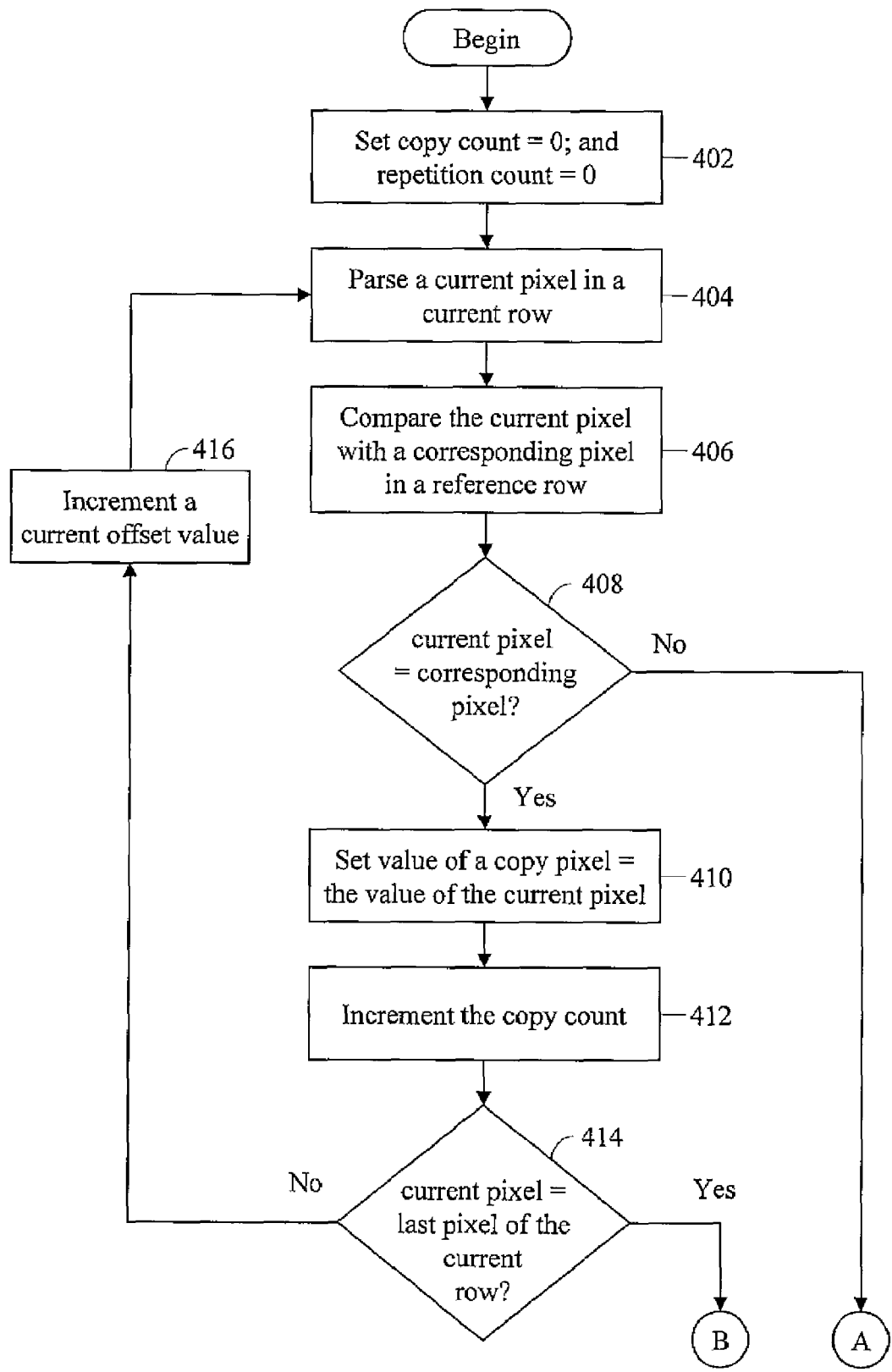
FIGS. 4A-4C are flowcharts of a method for encoding an image in accordance with an embodiment of the present invention.
Figure 4B:
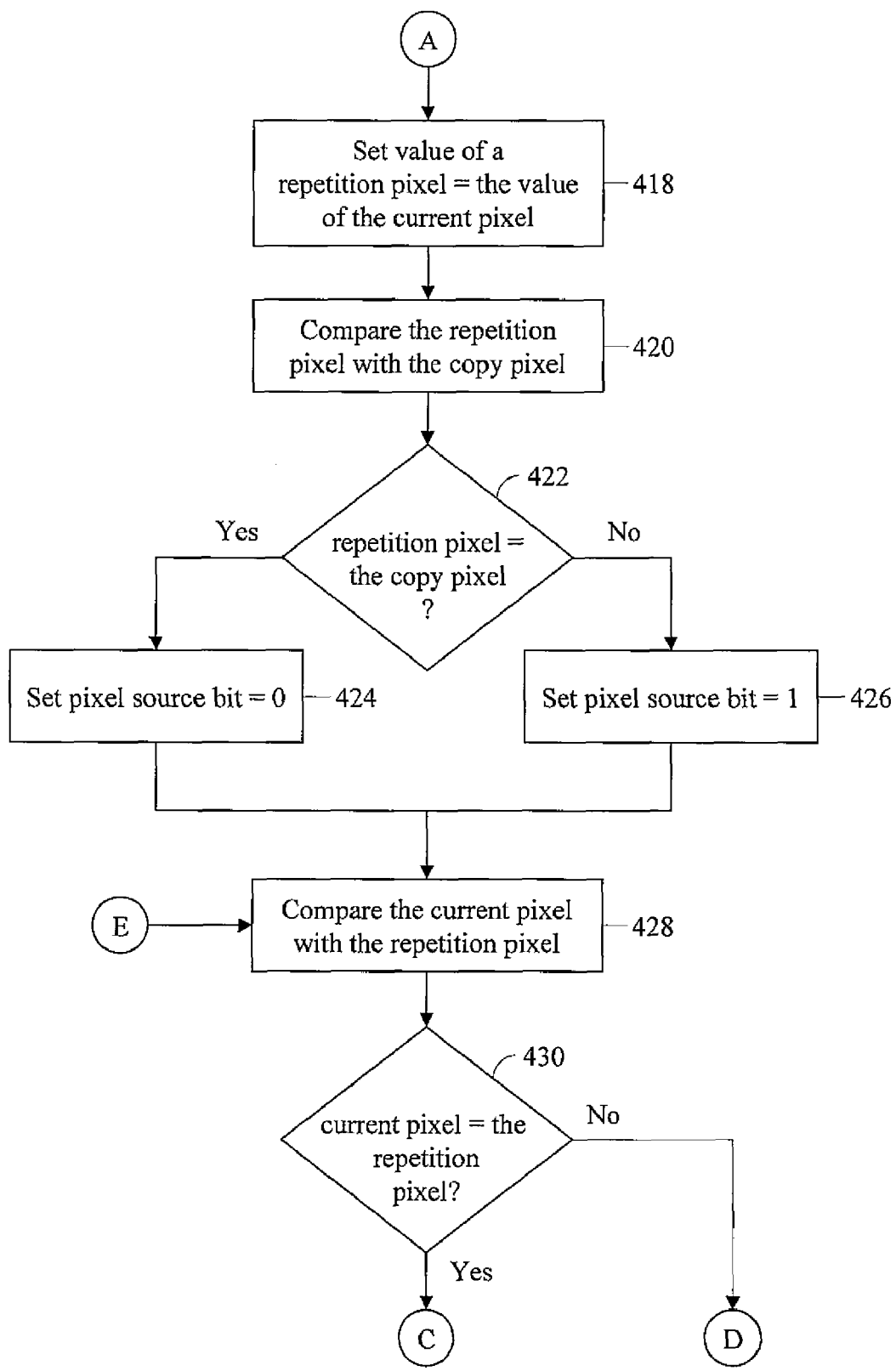
Figure 4C:
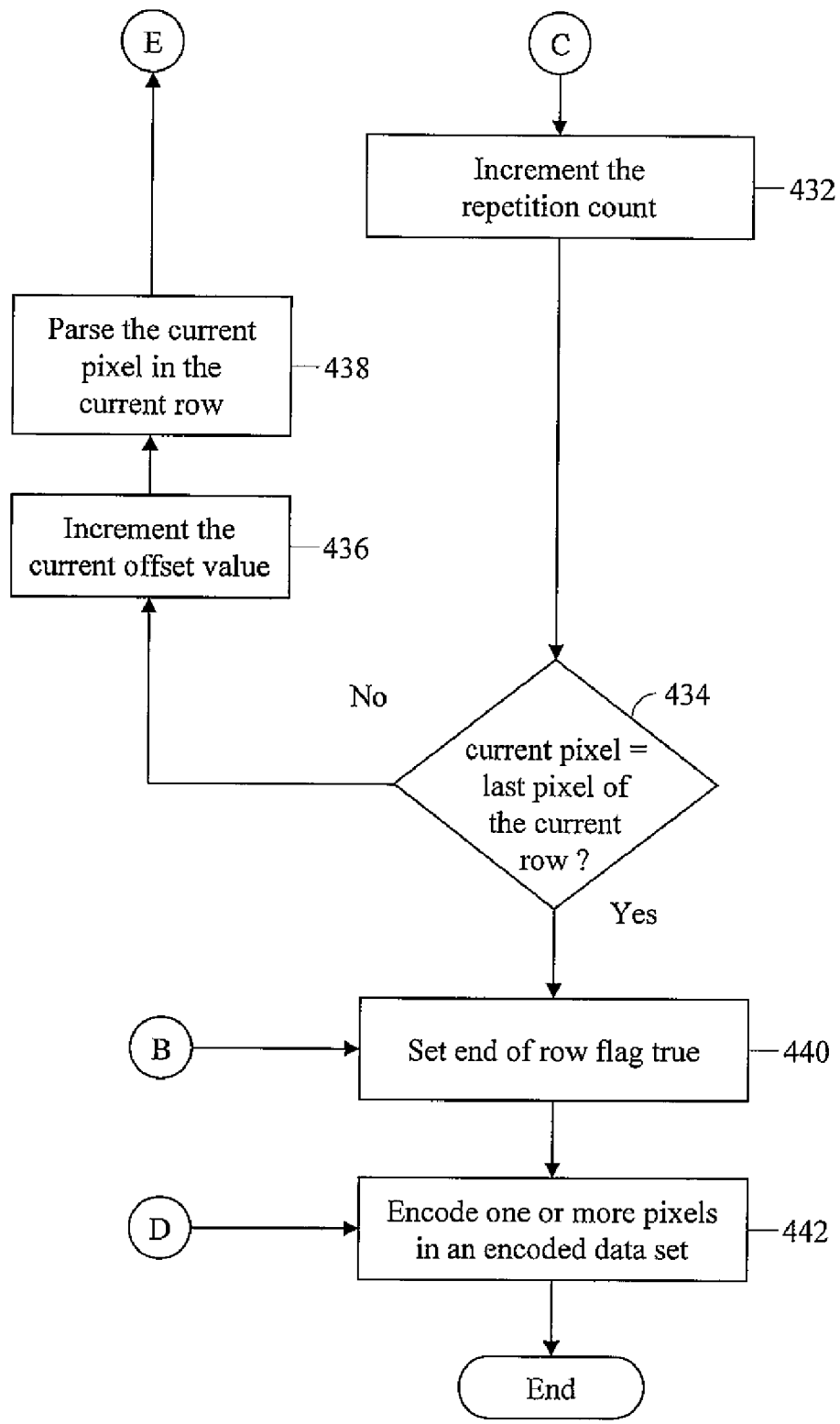

Referring now to FIGS. 4A-4C, flowcharts of a method for encoding an image in accordance with an embodiment of the present invention is shown.

The image includes a plurality of pixels arranged in a plurality of rows and columns. In an embodiment of the present invention, the image to be encoded is stored in a BMP file format in a memory space. The BMP file format stores RGB (Red, Green, Blue) graphics data with pixels 1-, 4-, 8-, or 24-bits in size. The BMP file includes various blocks of data such as a BMP file header, bitmap information, color palette, and the image. The BMP file header includes information relating to the size of the BMP file in bytes and an offset value i.e., starting address of the byte where the image can be found. Further, the bitmap information provides details regarding the image width in pixels, the image height in pixels, the number of bits per pixel, and the size of the image. Thus, by using the information stored in the bitmap information, the number of bits per pixel and the number of pixels in each row can be identified. Further, the BMP file header helps in identifying the location of the image, where each pixel of the image is associated with an offset value. The term, "offset value" as used herein encompasses an offset value of the pixel representing its location within the image. The purpose of incrementing and decrementing the offset value of a current pixel is to parse a next pixel of the image, where the next pixel then becomes the current pixel.

At step 402, a copy count and a repetition count of the encoded data set are initialized to zero. At step 404, a current pixel of a current row is parsed, where the current pixel is the pixel corresponding to a current offset value. At step 406, the current pixel is compared with a corresponding pixel in a reference row. In an embodiment of the present invention, the reference row is the row immediately preceding the current row and in case, if the current row is the first row, then a predefined row.

At step 408, the current pixel is compared with the corresponding pixel in the reference row. If at step 408, the current pixel is equal to the corresponding pixel, then step 410 is performed, else step 418 is performed.

At step 410, a value of a copy pixel is set equal to the value of the current pixel. Thereafter, at step 412, the copy count is incremented. The copy count indicates the number of pixels to be copied from the reference row. At step 414, it is determined whether or not the current pixel is a last pixel of the current row. If the current pixel is not the last pixel of the current row, step 416 is performed, else step 442 is performed. At step 416, the current offset value of the current pixel is incremented and steps 404 and 406 are repeated for the current pixel.

At step 418, a value of a repetition pixel is set equal to the value of the current pixel. Thereafter, at step 420, the repetition pixel is compared with the copy pixel. At step 422, it is determined whether or not the repetition pixel is equal to the copy pixel. If the repetition pixel is equal to the copy pixel, step 424 is performed, else step 426 is performed.

At step 424, a pixel source bit of a command byte in the encoded data set is set equal to zero. At step 426, the pixel source bit is set equal to one. Thereafter, at step 428, the current pixel is compared with the repetition pixel.

At step 430, it is determined whether or not the current pixel is equal to the repetition pixel. If the current pixel is equal to the repetition pixel, step 432 is performed, else step 440 is performed. At step 432, the repetition count is incremented. The repetition count indicates the number of times the repetition pixel is repeated in the current row. At step 434, it is determined whether or not the current pixel is the last pixel of the current row. If the current pixel is not the last pixel of the current row, step 436 is performed, else step 440 is performed. At step 436, the current offset value of the current pixel is incremented and then at step 438 the current pixel having the incremented offset value is parsed and step 428 is repeated.

At step 440, an end-of-row flag i.e., the end-of-row indicating bit, in the encoded data set is set true. At step 442, the pixels of the current row that were parsed using the above-described method are encoded in the encoded data set. The encoding of the image begins with parsing of the pixels from a first pixel in a first row of the image and continues to the last pixel in a last row.

Figure 5:
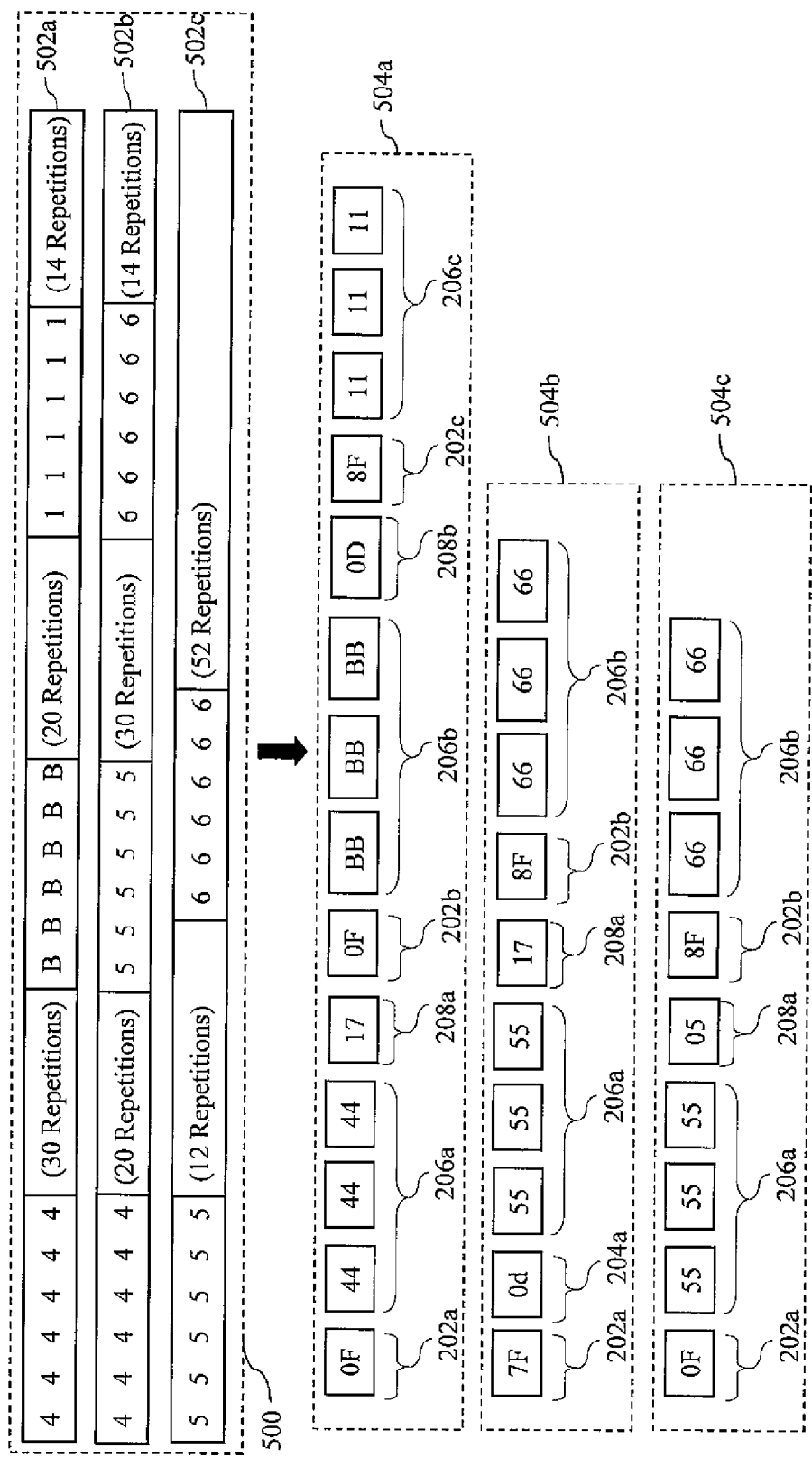
FIG. 5 is a schematic diagram of a method for encoding a 24-bit color image in accordance with an exemplary embodiment of the present invention.

Referring now to FIG. 5, a schematic diagram of a method for encoding a 24-bit color image 500 in accordance with an exemplary embodiment of the present invention is shown. The 24-bit colored image 500 includes a plurality of rows 502 such as rows 502a, 502b, and 502c. FIG. 5 also shows a plurality of encoded rows 504a, 504b, and 504c (referred to collectively as row 504) corresponding to the plurality of rows such as rows 502a, 502b, and 502c. Each encoded row 504 includes one or more encoded data sets representing the pixels in the corresponding row 502.

Each row 502 includes 64 contiguous pixels, where each pixel value is represented by 24 bits. As shown in FIG. 5, row 502a includes a series of 30 pixels having a hexadecimal value of '444444', 20 pixels having a hexadecimal value of 'BBBBBB', and 14 pixels having a hexadecimal value of '111111'. Similarly, row 502b includes a series of 20 pixels having a hexadecimal value of '444444', 30 pixels having a hexadecimal value of '555555', and 14 pixels having a hexadecimal value of '666666', and row 502c includes a series of 12 pixels having a hexadecimal value of '555555' and 52 pixels having a hexadecimal value of '666666'.

Each row 502 of the color image 500 is encoded separately using the method described above with reference to FIG. 1 and FIGS. 4A-4C. In various embodiments of the present invention, each row 502 is encoded in one or more encoded data sets, where each encoded data set includes the command byte 202, and optionally, the one or more copy-count bytes 204, the one or more pixel-data bytes 206, and the one or more repetition-count bytes 208.

Row 502a being the first row of the 24-bit color image 500 is encoded by selecting a predefined row as the reference row. Each pixel in the predefined row is assigned a predefined value. In the example shown in FIG. 5, each pixel in the predefined reference row has a hexadecimal value of '000000'.

Row 502b of the color image 500 is encoded by selecting row 502a as the reference row. The plurality of pixels in row 502b are compared with the plurality of corresponding pixels of row 502a. The pixels of row 502b that are equal to the corresponding pixels of row 502a are categorized in the first set of pixels. The pixels of row 502b that are not equal to the corresponding pixels of row 502a are categorized in the second set of pixels.

Thereafter, a third set of pixels is identified from the first and second sets of pixels. The third set of pixels includes a first group of pixels (copy pixels) i.e., a series of 20 pixels having the hexadecimal value of '444444' selected from the first set of pixels. The third set of pixels further includes a second group of pixels (repetition pixels) i.e., a series of 30 pixels, having a uniform pixel hexadecimal value of '555555', that are selected from the second set of pixels. In accordance with various embodiments of the present invention, one or more pixels in the first and second group of pixels are contiguous. Similarly, another third set of pixels includes only the second group of pixels i.e., a set of 14 pixels selected from the second set of pixels, each pixel having the hexadecimal value of '666666'. This other third set of 14 pixels includes the last pixel in the row 502b.

Thereafter, the third set of pixels and the other third set of pixels are encoded in the encoded data sets, where each encoded data set includes the command byte, and optionally the copy-count bytes 204, the pixel-data bytes 206, and the repetition-count bytes 208.

As shown in FIG. 5, the command bytes 202a and 202b include the predefined information related to the one or more pixels in the respective third set of pixels. For example, in the command byte 202a, the end-of-row indicating bit is reset indicating the absence of the last pixel in the third set of pixels. Further, the copy-count bits are set to 111 (7 copy pixels), which indicates a count of the first group of pixels, i.e. the number of pixels that are to be copied from the row 502a.

The pixel source bit is set to 1, which represents that the uniform pixel value of the second group of pixels (repetition pixels) is not equal to a pixel value of the last pixel in the first group of pixels. The repetition-count bits are set to 111 (7 repetition pixels), which indicates a count of the second group of pixels, i.e. the number of times the pixel having the uniform pixel value is repeated in the row 502b. Hence, the command byte 202a is represented as 01111111 (7F).

Due to the saturation of the copy-count bits in the command byte 202a, an unsaturated copy-count byte 204a having hexadecimal value of '0d' (20−7=13 copy pixels) is appended to the command byte 202a. The hexadecimal value '555555' of the second group of pixels is represented by the pixel-data byte 206a. Further, due to the saturation of the repetition-count bits in the command byte 202a, an unsaturated repetition-count byte 208a having hexadecimal value of '17' (30−7=23 repetition pixels) is appended to the pixel-data byte 206a.

Similarly, the command byte 202b is encoded to include information related to the other third set of pixels in row 502b. The end-of-row indicating bit is set, which provides an indication of the presence of the last pixel in the other third set of pixels. Due to the absence of the first group of pixels in the other third set of pixels, the copy-count bits are set to zero. The pixel source bit is set to 1. The repetition-count bits are set to 111 (7 repetition pixels), which indicates a count of the second group of pixels and consequently, the number of times the pixel having the uniform pixel value '666666' is repeated in row 502b. Hence, the command byte 202b is represented as 10001111 (8F).

The hexadecimal value '666666' of the second group of pixels is represented by the pixel-data byte 206b. As the second group of pixels is repeated to the end of the row and the end-of-row indicating bit in the command byte 202b is set equal to one, thus, the repetition-count bytes 208b, representing the remaining count of the repetition pixel, are not included. Rows 502a and 502c are encoded in a similar manner to generate encoded rows 504a and 504c as shown in FIG. 5.

Figure 6:
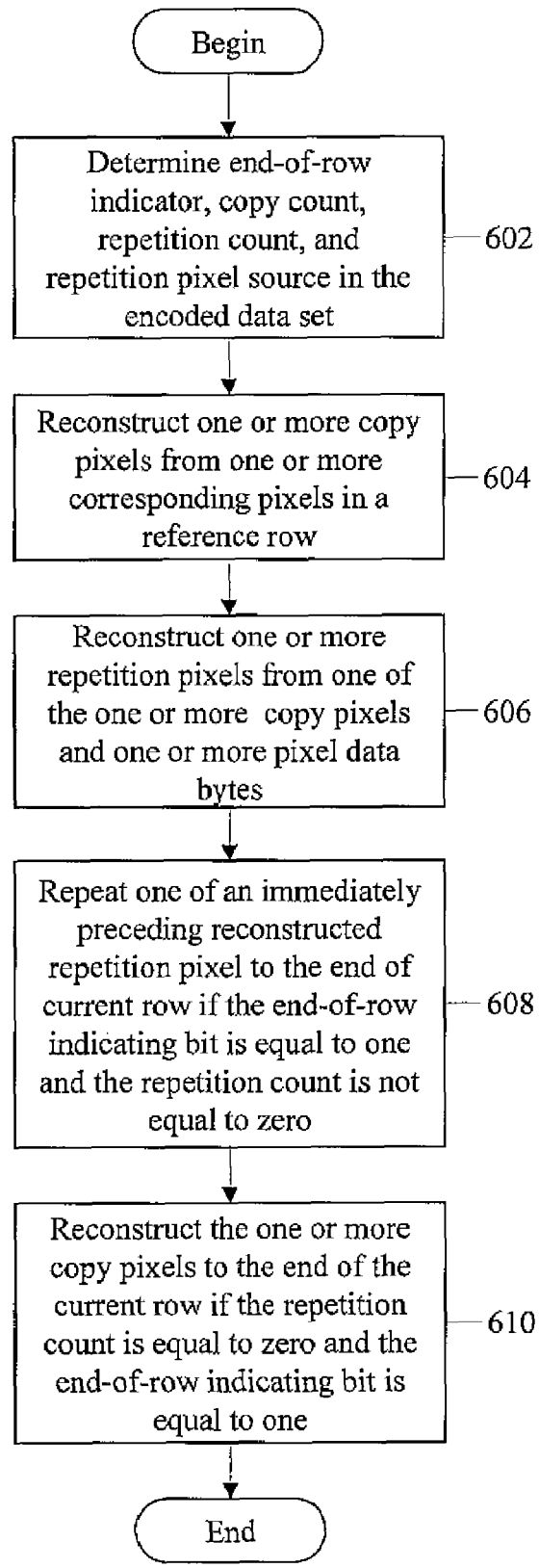
FIG. 6 is a flowchart of a method for decoding an encoded image in accordance with an embodiment of the present invention.

Referring now to FIG. 6, a flowchart of a method for decoding an encoded image in accordance with an embodiment of the present invention is shown.

The image includes a plurality of pixels arranged in a plurality of rows and columns. The encoded data set includes a command byte, and optionally, one or more copy-count bytes, one or more pixel-data bytes and one or more repetition count bytes. The command byte includes an end-of-row indicating bit, one or more copy-count bits, a pixel source bit, and one or more repetition-count bits, all as previously described above.

At step 602, the encoded data set is parsed and an end-of-row indicator, a copy count, a repetition count, and a repetition pixel source are determined in the encoded data set. The copy count is determined from the one or more copy-count bits of the command byte and optionally, from the copy-count bytes in the encoded data set. Similarly, the repetition count is determined from the one or more repetition-count bits of the command byte and optionally, from the repetition-count bytes in the encoded data set.

At step 604, one or more copy pixels are reconstructed from one or more corresponding pixels in a reference row based on the copy count determined at step 602.

At step 606, one or more repetition pixels are reconstructed from one of a copy pixel of the one or more copy pixels and the one or more pixel-data bytes based on the repetition count and the repetition pixel source determined at step 602.

At step 608, an immediately preceding reconstructed repetition pixel that was reconstructed at step 606, is repeated to the end of a current row if the end-of-row indicating bit is equal to one and the repetition count is not equal to zero.

At step 610, the one or more copy pixels that are reconstructed at step 604, are reconstructed to the end of the current row from the one or more corresponding pixels in the reference row if the end-of-row indicating bit is equal to one and the repetition count is equal to zero. The method for decoding the encoded image is described in details below with reference to FIGS. 7A-7B.

Figure 7A:
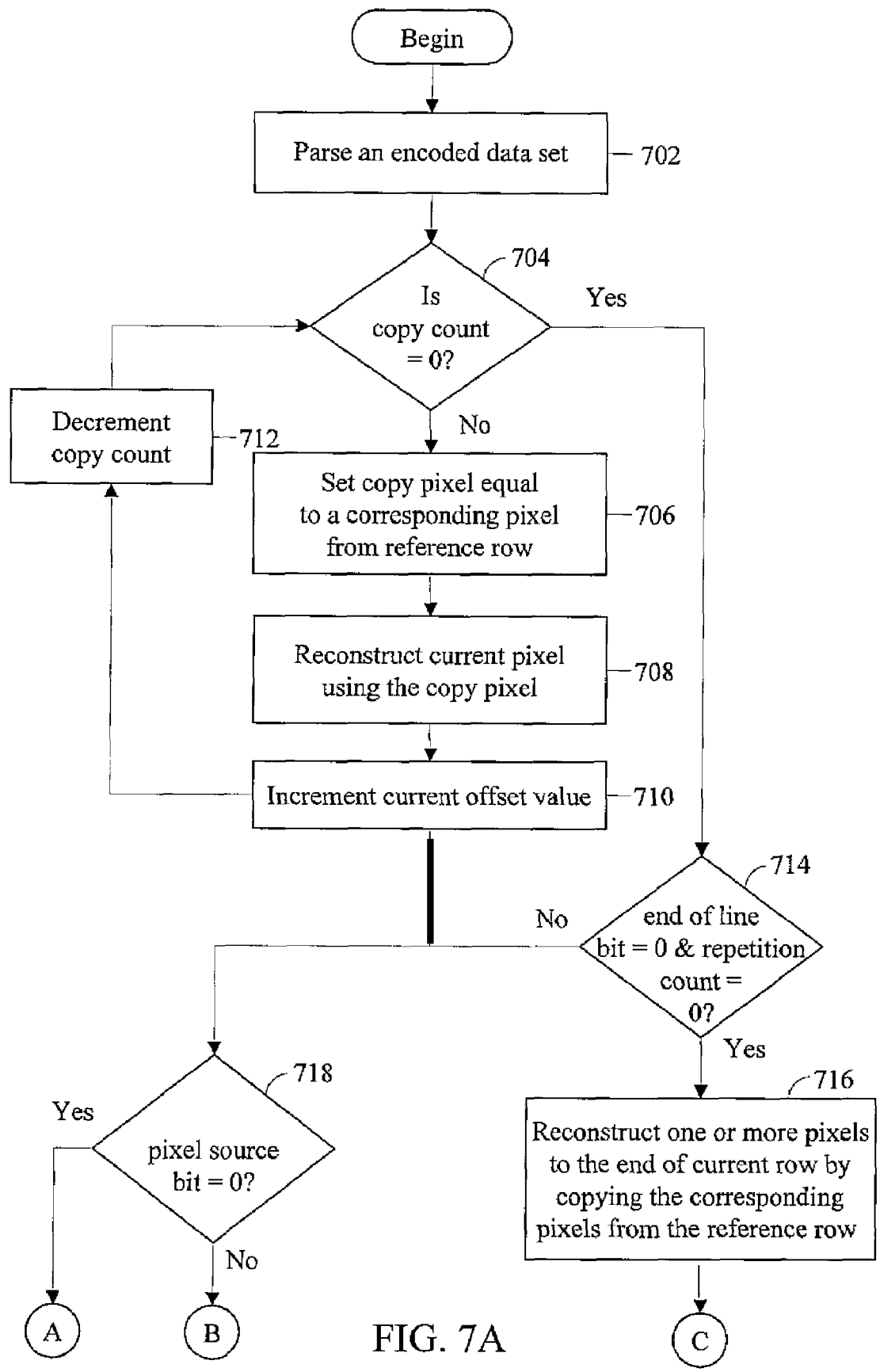
FIGS. 7A-7B are a more detailed flowchart of a method for decoding an encoded image in accordance with an embodiment of the present invention.
Figure 7B:
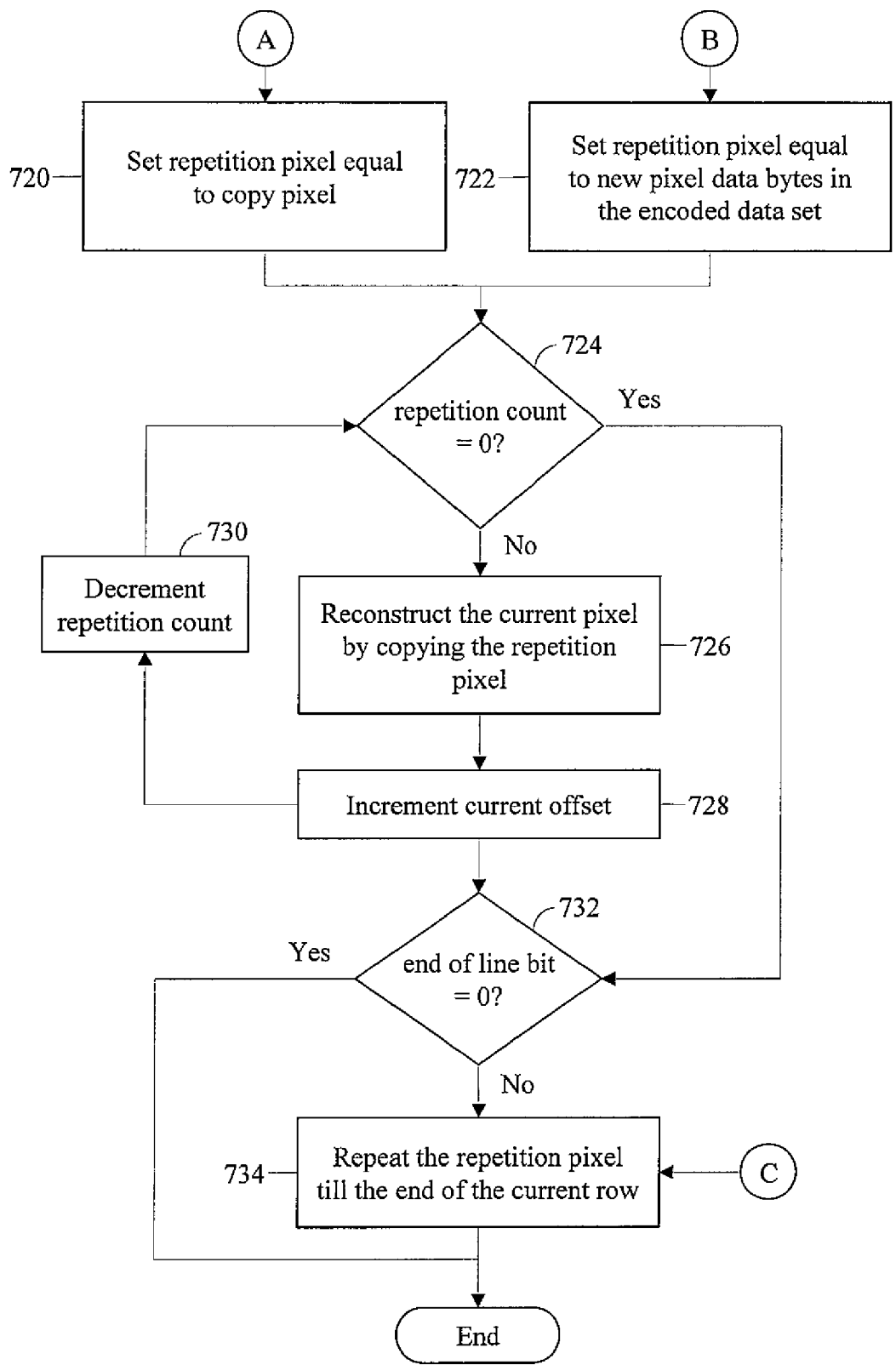

FIGS. 7A-7B show a more detailed flowchart of a method for decoding the encoded image in accordance with an embodiment of the present invention.

At step 702, the encoded data set is parsed. At step 704, a check is performed to determine whether the copy count in the encoded data set is zero. If the copy count is not equal to zero, step 706 is performed, else step 614 is performed. At step 706, a value of a copy pixel is set equal to a value of a corresponding pixel from a reference row. Thereafter, at step 708, a current pixel is reconstructed using the copy pixel. At step 710, a current offset value of the current pixel is incremented and then at step 712 the copy count is decremented and steps 704, 706, 708 and 710 are repeated until the copy count is reduced to zero.

At step 714, it is determined if the end-of-row indicating bit=1 and the repetition count=0. If, at step 714, the end-of-row indicating bit=1 and the repetition count=0, step 716 is performed, else step 718 is performed. At step 716, one or more pixels are reconstructed to the end of a current row by copying the corresponding pixels from the reference row.

At step 718, it is determined if the pixel source bit is equal to zero. If the pixel source bit is equal to zero then, step 720 is performed, else step 722 is performed. At step 720, a value of a repetition pixel is set equal to the value of the copy pixel. At step 722, the value of the repetition pixel is set equal to the one or more pixel-data bytes.

Thereafter, at step 724, it is determined if the repetition count is equal to zero. If the repetition count is not equal to zero, step 726 is performed, else step 732 is performed. Then at step 726, the current pixel is reconstructed by copying the repetition pixel. At step 728, the current offset value of the current pixel is incremented and then at step 730 the repetition count is decremented and steps 724, 726 and 728 are repeated until the repetition count is reduced to zero.

At step 732 it is determined if the end-of-row indicating bit is equal to 1. If the end-of-row indicating bit is equal to 1 then, at step 734, the repetition pixel is repeated to the end of the current row and the process of decoding the encoded data set is completed. The steps outlined above are repeated for each encoded data set in the encoded image.

Figure 8:
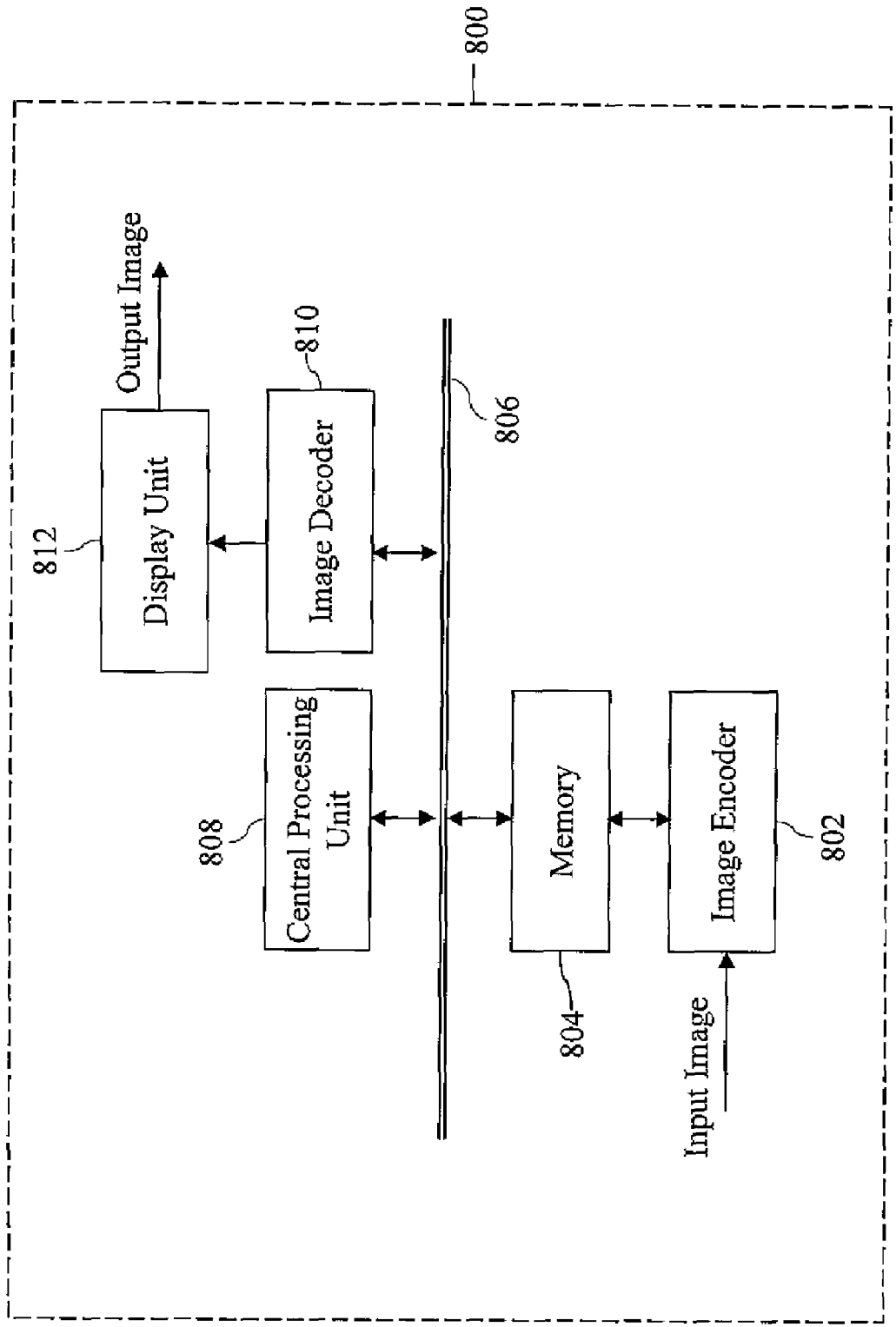
FIG. 8 is a schematic block diagram of a global positioning system (GPS) device in accordance with an embodiment of the present invention.

Referring now to FIG. 8, a schematic block diagram of a global positioning system (GPS) device 800 in accordance with an embodiment of the present invention is shown. The GPS device 800 includes an image encoder 802. The image encoder 802 receives input images containing text, graphics, or combinations thereof.

In an embodiment of the present invention, the input images received by the GPS device 800 are primarily cluster images containing a large amount of pre-programmed data. This data is used for displaying information corresponding to various navigational data, such as control signals, road signs, caution notices, and so forth. The image encoder 802 encodes the input image using the method described above with reference to FIG. 1 and FIGS. 4A-4C. Each row of the input image is encoded separately and independently. A memory 804, connected to the image encoder 802, stores the encoded image.

A data bus 806 connected to the memory 804, a central processing unit 808, and an image decoder 810 facilitate the transfer of the image within the GPS device 800. At the time of decoding, the image decoder 810 fetches the encoded image from the memory 804. In various embodiments of the present invention, the image decoder 810 includes a memory (not shown) to store the fetched encoded image. The image decoder 810 decodes the encoded image in accordance with the method for decoding an encoded image described above with reference to FIG. 6 and FIGS. 7A-7B. Thereafter, a display unit 812, connected to the image decoder 810, receives the decoded image from the image decoder 810 and displays it on a screen.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A method for encoding an image, wherein the image comprises a plurality of pixels arranged in a plurality of rows and columns, the method comprising:
    identifying a first set of pixels from the plurality of pixels in a current row, wherein the first set of pixels comprises one or more pixels equal to one or more corresponding pixels in a reference row;
    identifying a second set of pixels from the plurality of pixels in the current row, wherein the second set of pixels comprises one or more pixels not equal to one or more corresponding pixels in the reference row;
    identifying a third set of pixels, the third set of pixels comprising at least one of:
        a first group of pixels selected from the first set of pixels, wherein the first group of pixels comprises one or more contiguous pixels; and
        a second group of pixels selected from at least one of the first set of pixels and the second set of pixels, wherein the second group of pixels comprises one or more contiguous pixels having a uniform pixel value, and wherein at least one pixel selected from the second set of pixels precedes one or more pixels selected from the first set of pixels in the current row,
    wherein the first group of pixels and the second group of pixels are contiguous in the current row; and
    encoding the third set of pixels in an encoded data set, wherein the encoded data set comprises data corresponding to at least one of an end-of-row indicator indicating an end of the current row, a count of the first group of pixels, a count of the second group of pixels, and a pixel source for the one or more contiguous pixels in the second group of pixels.

2. The method for encoding an image of claim 1, wherein the encoded data set includes a command byte, the command byte comprising an end-of-row indicating bit providing an indication of the end of the current row.

3. The method for encoding an image of claim 1, wherein the encoded data set includes a command byte, the command byte comprising one or more copy-count bits providing information related to at least a part of the count of the first group of pixels.

4. The method for encoding an image of claim 1, wherein the command byte comprises one or more repetition-count bits providing information related to at least a part of the count of the second group of pixels.

5. The method for encoding an image of claim 1, wherein the encoded data set includes a command byte, the command byte comprising a pixel source bit providing information related to the pixel source for the one or more pixels in the second group of pixels.

6. The method for encoding an image of claim 5, wherein the pixel source bit is reset if the uniform pixel value of the one or more pixels in the second group of pixels is equal to a pixel value of a last pixel in the first group of pixels, and the pixel source bit is set if the uniform pixel value of the one or more pixels in the second group of pixels is not equal to the pixel value of the last pixel in the first group of pixels.

7. The method for encoding an image of claim 1, wherein the encoded data set comprises one or more repetition-count bytes if one or more repetition-count bits providing information related to at least a part of the count of the second group of pixels are saturated, and wherein the one or more repetition-count bytes provide information related to a part of the count of the second group of pixels.

8. The method for encoding an image of claim 7, wherein the one or more repetition-count bytes is unsaturated.

9. The method for encoding an image of claim 1, wherein the encoded data set comprises one or more pixel-data bytes if the uniform pixel value of the one or more pixels in the second group of pixels is not equal to a pixel value of a last pixel in the first group of pixels.

10. The method for encoding an image of claim 1, wherein the reference row is a row immediately preceding the current row in the plurality of rows in the image.

11. The method for encoding an image of claim 1, wherein the reference row is a predefined row, and each pixel in the reference row is assigned a predefined value.

12. A method for encoding an image, wherein the image comprises a plurality of pixels arranged in a plurality of rows and columns, and wherein each pixel is associated with an offset value, the method comprising:
    (a) parsing a current pixel in a current row, wherein the current pixel is a pixel corresponding to a current offset value;
    (b) comparing the current pixel with a corresponding pixel in a reference row, wherein if the current pixel has a same value as the corresponding pixel in the reference row, then
    (c) setting a value of a copy pixel equal to the value of the current pixel;
    (d) incrementing a copy count, wherein the copy count indicates a number of pixels to be copied from the reference row; and
    (e) incrementing the current offset value and repeating steps (a) and (b) if the current pixel is not a last pixel in the current row, else setting an end-of-row flag true and encoding one or more pixels in an encoded data set, wherein the encoded data set comprises information corresponding to at least one of the end-of-row flag, the copy count, the repetition count, and the repetition pixel; else,
    (f) setting a value of a repetition pixel equal to a value of the current pixel; and
    (g) comparing the current pixel with the repetition pixel, and if the current pixel is equal to the repetition pixel, then (h) incrementing a repetition count, wherein the repetition count indicates a number of times the repetition pixel is repeated;

(i) incrementing the current offset value, and repeating steps (a) and (g) if the current pixel is not the last pixel in the current row, else setting the end-of-row flag true; and (j) encoding one or more pixels in an encoded data set, wherein the encoded data set comprises information corresponding to at least one of the end-of-row flag, the copy count, the repetition count, and the repetition pixel.

13. The method for encoding an image of claim 12, wherein steps (a) through (j) are performed for each pixel in each row in the plurality of rows.

14. The method for encoding an image of claim 12, wherein the encoded data set comprises a command byte.

15. The method for encoding an image of claim 14, wherein the command byte includes one or more copy-count bits providing information related to at least a part of the copy count.

16. The method for encoding an image of claim 15, wherein the command byte further comprises one or more repetition-count bits providing information related to at least a part of the repetition count, and a pixel source bit providing information related to a pixel source for the repetition pixel.

17. The method for encoding an image of claim 12, wherein the reference row is a row immediately preceding the current row in the plurality of rows in the image.

18. The method for encoding an image of claim 12, wherein the reference row is a predefined row, and each pixel in the reference row is assigned a predefined value.

* * * * *